United States Patent [19]
Gross et al.

[11] Patent Number: 6,075,661
[45] Date of Patent: Jun. 13, 2000

[54] ADAPTER FOR OBJECTIVE LENS OF AN OPTICAL INSTRUMENT

[75] Inventors: Ted J. Gross, Leonardtown, Md.; Paul C. Schreck, San Marcos, Calif.

[73] Assignee: The United States of America as represented by the Secretary of the Navy, Washington, D.C.

[21] Appl. No.: 09/237,402

[22] Filed: Jan. 26, 1999

[51] Int. Cl.[7] ................................................. G02B 7/02
[52] U.S. Cl. .......................................... 359/819; 359/829
[58] Field of Search ................................... 359/811, 818, 359/819, 829, 411, 409, 412

[56] References Cited

U.S. PATENT DOCUMENTS

| | | | |
|---|---|---|---|
| 729,848 | 6/1903 | Common | 359/412 |
| 5,361,162 | 11/1994 | Goebel | 359/411 |
| 5,617,257 | 4/1997 | Sheehy et al. | 359/411 |
| 5,764,424 | 6/1998 | Jaeger et al. | 359/819 |

FOREIGN PATENT DOCUMENTS 0105702  7/1982  Japan ................................... 359/811

*Primary Examiner*—Huy Mai
*Attorney, Agent, or Firm*—Ron Billi

[57] ABSTRACT

An adapter is disclosed for operatively mating an optical laser interference filter with an objective lens of night vision goggles, without causing an incompatibility between the night vision goggles and the Gideon NVG Head Up Display.

12 Claims, 5 Drawing Sheets

ADAPTER FOR OBJECTIVE LENS OF AN OPTICAL INSTRUMENT

STATEMENT OF GOVERNMENT'S INTEREST

This invention described herein, may be manufactured or used by and for the Government of the United States of America for governmental purposes without the payment of any royalty thereon or therefor.

BACKGROUND OF THE INVENTION

The human eye is a remarkably effective organ adaptable to a wide range of ambient light levels which can be functionally enhanced or improved by a host of optical instruments. For instance, visual function can be extended beyond the visible spectrum into the infrared portion of the spectrum by using night vision goggles and forward looking infrared devices (e.g., FLIDs) which are applicable to industrial applications, but particularly suited for military applications.

Night vision goggles (NVGs) are a helmet mounted binocular image intensifier. Head mounted night vision goggles are known and some of which are described in U.S. Pat. Nos. 5,361,162 and 5,617,257 both of which are herein incorporated by reference. The NVG provides the user with a 30 to 40 degree intensified field of view with an enhanced acuity at low ambient light levels (quarter moon down through starlight).

Once the human eye of the user becomes adapted to a dimly lit background, the NVG provides the user with vision therein. However, the vision in this dimly lit background may be disturbed or destroyed, or more importantly, the NVG and/or human eye may be damaged by the occurrence of sudden bright visual light, such as that created by a laser.

The human eye may be protected and even not disturbed by the bright light created by a laser by using a laser interference filter having the form of an optical lens and incorporated into goggles that are commonly used around laser equipment, some of which may create intense heat sufficient to cut metal. It is desired to incorporate the optical laser interference filter into night vision goggles so as to protect the NVG and/or human eye from being harmed or even disturbed by the bright visual light created by a laser source.

Night vision goggles (NVG) commonly comprise an objective lens that is positioned so as to face the object being viewed by the user and has a bezel on its rim defined by the outer diameter of the objective lens. Similarly, goggles used around laser equipment commonly incorporate an optical laser interference filter that is positioned to face the object being viewed by the user and has a bezel on its rim defined by the outer diameter of the optical laser interference filter.

The night vision goggles originally had tubes that were fitted with the NVG Head Up Display (HUD), which is a device that presents critical flight, engine and armament information in the form of symbology, to the pilot. The NVG and the HUD are completely separate pieces of equipment; i.e., the NVGs can be considered aircrew equipment, while the HUD is aircraft equipment.

Recently, the laser interference filter (LIF) was incorporated onto the NVG tubes to protect the tubes from laser induced damage. The LIF is installed by gluing a bezel onto the outer diameter of the NVG tubes, thereby, increasing effectively the diameter to about 1 7/16 inches. With this modification, the NVG HUD cannot be fastened onto the NVGs as before. It is desired that means be provided for fitting the NVG HUD onto the LIF bezel.

SUMMARY OF THE INVENTION

The present invention is directed to an adapter for an optical instrument, such as night vision goggles equipped with an optical laser interference filter that mates with the inner diameter of a NVG HUD.

The adapter is for an optical instrument having an objective lens, a laser interference filter having a first set of threads of a first predetermined pitch and defined by the outer diameter of the laser interference filter, and a laser interference filter mounting bezel having a second set of threads of a second predetermined pitch and defined by the inner diameter of the laser interference filter mounting bezel. The adapter comprises a nipple having third and fourth sets of threads with pitches respectively corresponding to the first and second pitches and with the pitches of the third and fourth sets of threads being respectively defined by the outer diameter of the laser interference filter and the inner diameter of the laser interference filter mounting bezel.

Accordingly, it is the object of the present invention to provide an adapter that quickly allows the NVG HUD to be mated with an objective lens of an optical instrument, such as night vision goggles modified by a laser interference filter (LIF).

It is also an object of the present invention to provide an adapter that allows a NVG HUD to be quickly attached to an optical instrument without the need to perform any modifications to or calibration of the optical instrument.

It is a further object of the present invention to provide an adapter that holds its elements in a stationary, predetermined optical relationship with respect to each other and the optical axis of the instrument, yet be easily disassembled for removal from the aircraft or for cleaning purposes.

Other objects, advantages and novel features of the invention will become apparent from the following detailed description when considered in conjunction with the accompanying drawings therein.

DETAILED DESCRIPTION OF THE PREFERRED EMBODIMENTS

The present invention is an adapter broadly directed to optical instruments having a wide range of applications. The principles of the present invention may be better appreciated by first referring to one application of the present invention directed to the latest version of the night vision goggle is an AN/AVS-6V and identified in FIG. 1 by reference number 10.

Figure 1:
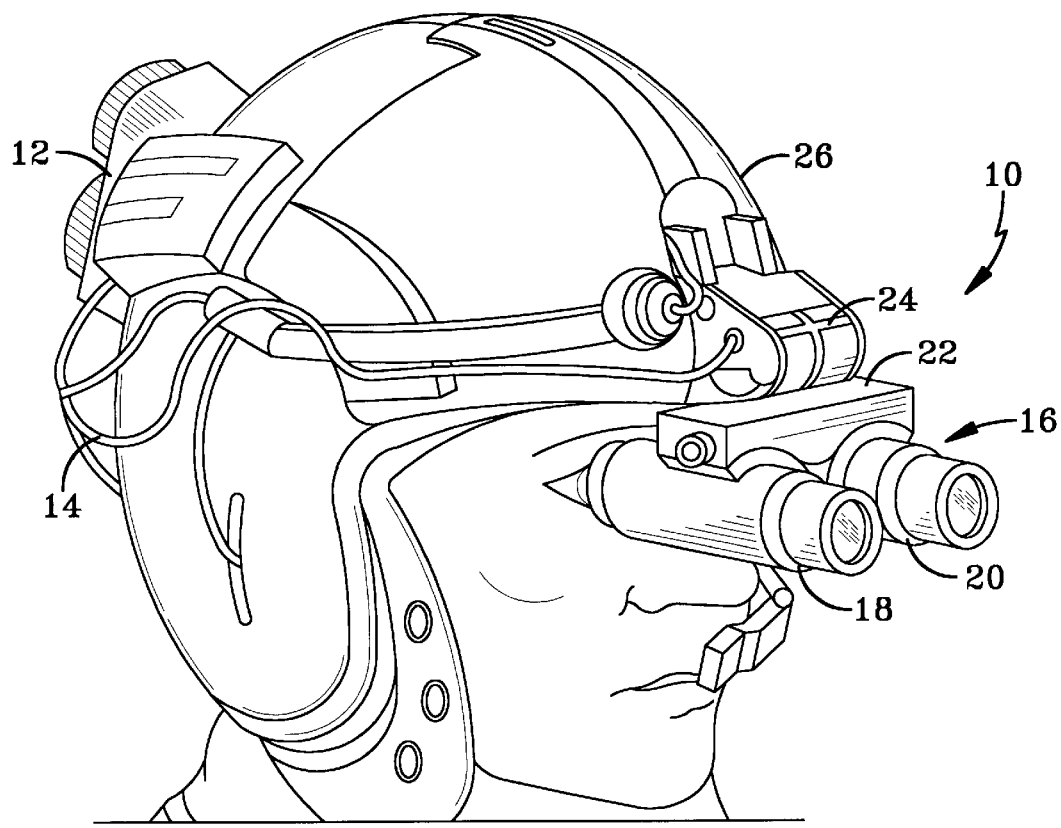
FIG. 1 illustrates helmet mounted night vision goggles (NVG) in the as-worn position.
Figure 2:
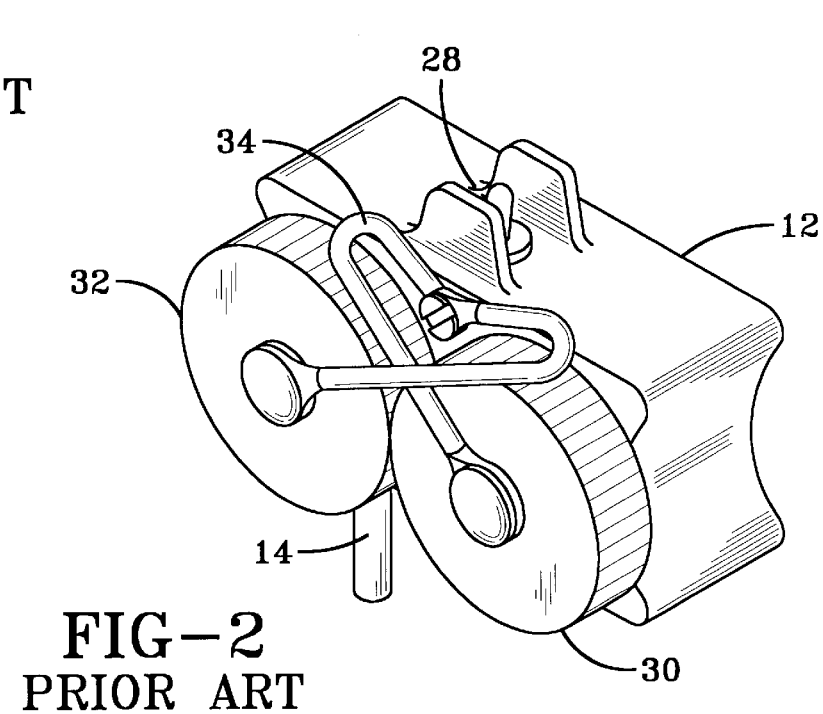
FIG. 2 illustrates the dual NVG battery pack.

The AN/AVS-6V night-vision device is a helmet mounted image intensifier and is shown in the as-worn position in FIG. 1 and comprises a battery pack 12 having an input/output power cable 14, a pair of binoculars 16 comprising monocular assemblies 18 and 20 arranged in side-by-side manner, an interpupillary adjustment shelf 22 attached to the monocular assemblies 18 and 20, and a mount 24. The NVG 20 is attached to a helmet 26 via a mount 24 which allows the AN/AVS-6V to be removed or rotated up and out of the user's field of view when not in use. The AN/AVS-6V is powered by a battery pack 12, shown in FIG. 2, that attaches to the rear of the helmet 26.

The battery pack 12 comprises a three position switch 28, and screw-on battery caps 30 and 32 with retainer straps 34. The battery pack 12 contains two independent battery packs (not shown) which the user selects between using the toggle switch 28 to extend the AN/AVS-6V operating time.

Figure 3:
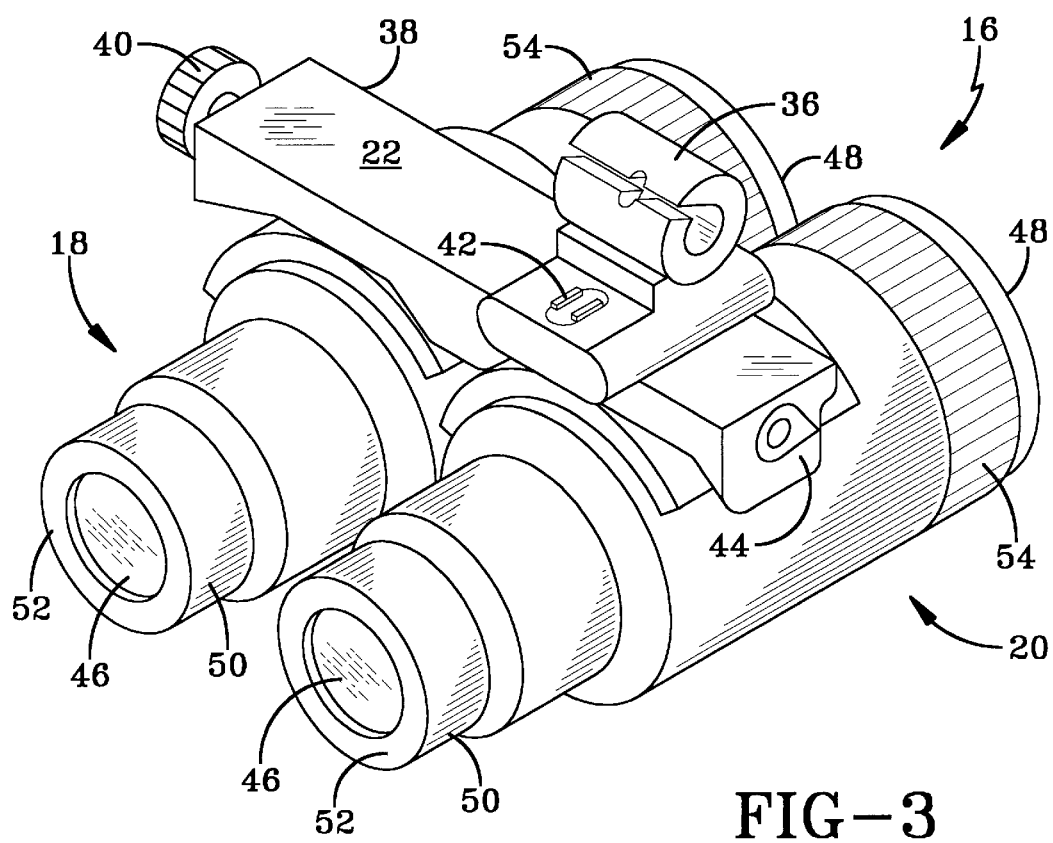
FIG. 3 illustrates NVG detached from the helmet.

The NVG monoculars 18 and 20 are connected to the helmet mount 24 (see FIG. 1) by a coupling device 36 (see FIG. 3) that is located above a platform 38 of the shelf 22. The platform 38 provides a housing for a plurality of adjustments for the monocular assemblies 18 and 20, such knob 40 that is used to adjust the separation between the NVG monoculars to accommodate the user's interpupillary distance (IPD), a forward/aft adjustment knob 42, and a tilt adjustment lever 44.

As known in the art, the AN/AVS-6V, in particular the binoculars 16, are sensitive to the near infrared spectrum of the night sky to provide a user with improved vision under low ambient light levels (quarter moon down to starlight). The NVG monocular assemblies include an objective lens 46 and an eyepiece lens 48 (not fully shown). Each objective lens 46 is mounted in an enclosure 50 having an entrance portion 52 with a predetermined diameter. Each eyepiece lens 48 cooperates with a respective eyepiece focus ring 54.

As discussed in the "Background" section, AN/AVS-6V, without the benefits of a laser interference filter (LIF), is plagued by an inability to safeguard against damage to the NVG and/or human eye caused by sudden bursts of visible light created by, for example, a laser source. This damage may be mainly damage to the optical tubes of the NVG. As further described in the "Background" section, a laser interference filter having the form of an optical lens is commonly used to rid a user, in particular, the NVG tube and/or human eye of the detriments of bright laser sources, and has a bezel with a predefined pitch on its rim, defined by its outer diameter. The outer diameter of the bezel of the optical laser interference filter (LIF) is different than the inner diameter of the NVG/HUD. The present invention provides means for fitting the NVG/HUD onto the LIF mounting bezel and may be further described with reference to FIG. 4.

Figure 4B:
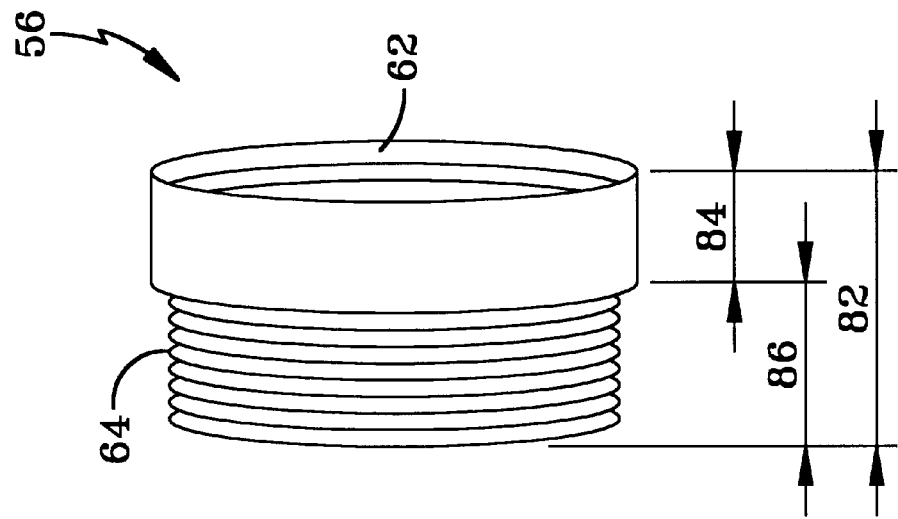
FIG. 4 is composed of 4(A) and 4(B) that illustrate different aspects of the adapter of the present invention.
Figure 4A:
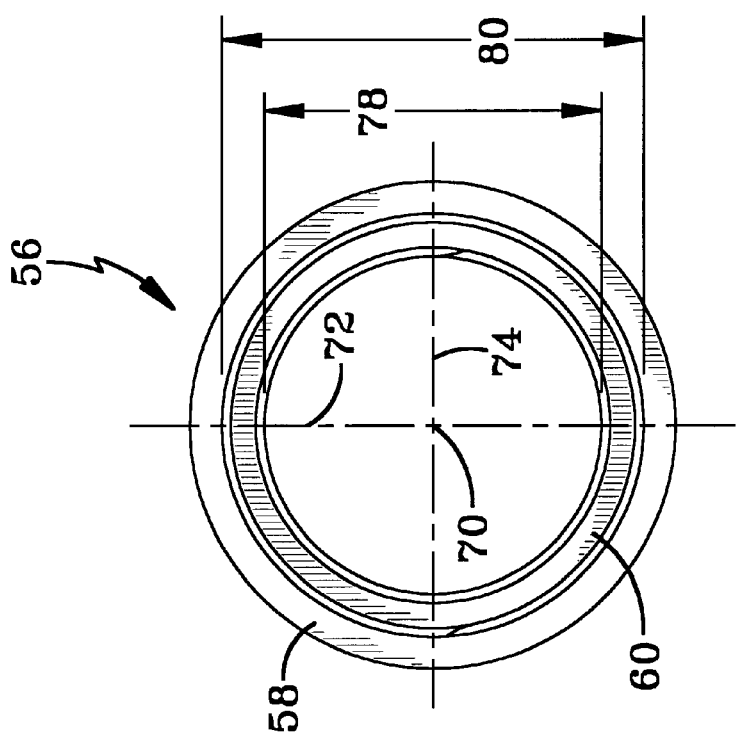
Figure 5:
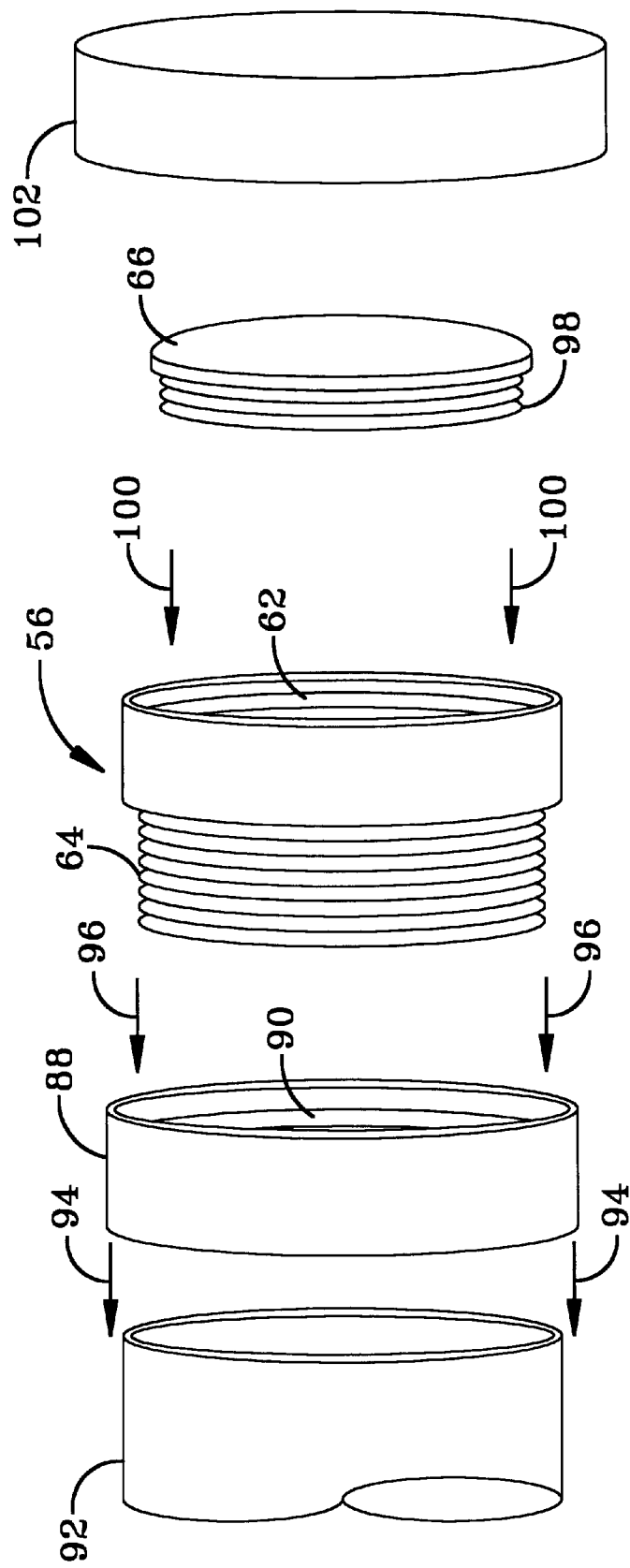
FIG. 5 illustrates the adapter of the present invention mating the laser interference filter with the NVG.

FIG. 4 is composed of FIGS. 4(A) and 4(B), with FIG. 4(A) being a front plan view of adapter 56 showing ledges 58 and 60 thereof, and FIG. 4(B) being a side view of adapter 56 having interior threads 62 and exterior threads 64. The interior threads 62 threadly engage complementary threads of a laser interference filter (LIF) 66 in a manner to be described hereinafter with reference to FIG. 5.

FIG. 4(A) illustrates that adapter 56 has a center 70 defined by axes 72 and 74. The adapter 56 has, in one embodiment, the form of a pipe coupler, such as a nipple, having the first and second set of threads 62 and 64 (more clearly shown in FIG. 4(B)) each having a predetermined pitch. The second and first sets of threads 64 and 62 are respectively further defined by first and second predetermined diameters 78 and 80 shown in FIG. 4(A).

The adapter 56 has a typical overall length 82, shown in FIG. 4(B), of 0.480 inches. The first set of threads 62 typically occupies a length 84 of 0.195 inches and the second set of threads 64 typically occupies a length 86 of 0.280 inches. The adapter 56 is preferably comprised of an anodized aluminum alloy such as a type material 6061-T6 A1 alloy.

The optical laser interference filter (LIF) 66 is known in the art and has a predetermined attenuation band which is defined by a visible-light range between 7500 and 3900 angstrom corresponding to that of a typical laser source. The optical laser interference filter 66 is positioned in front of the objective lens 46. The laser interference filter 66 is mated to the NVG/HUD 10 by means of the adapter 56 which may be further described with reference to FIG. 5.

The mating is accomplished by first placing a laser interference filter mounting bezel 88 having interior threads 90 onto an optical tube 92 of the NVG 10 in the direction indicated by arrows 94. The laser interference filter mounting bezel 88 is preferably glued onto the optical tube 92. The adapter 56, in particular its threads 64, are then screwed into the threads 90 inward in the direction indicated by arrows 96. The laser interference filter 66, in particular its threads 98, are then screwed inward into the threads 62 in the direction indicated by arrows 100. A member 102 operatively interconnected (not shown) to the NVG 10 is now slid to the adapter 56. The NVG 10 having member 102 is commonly referred to in the art as a NVG Gideon HUD. The outer diameter of the adapter 56 matches the outer diameter of the optical tube 92 allowing the laser interference filter 66 to be matched to the NVG 10 without causing any changes to NVG 10 nor to the laser interference filter 66. The adapter 56 provides for improved binoculars 104 shown in FIG. 6.

Figure 6:
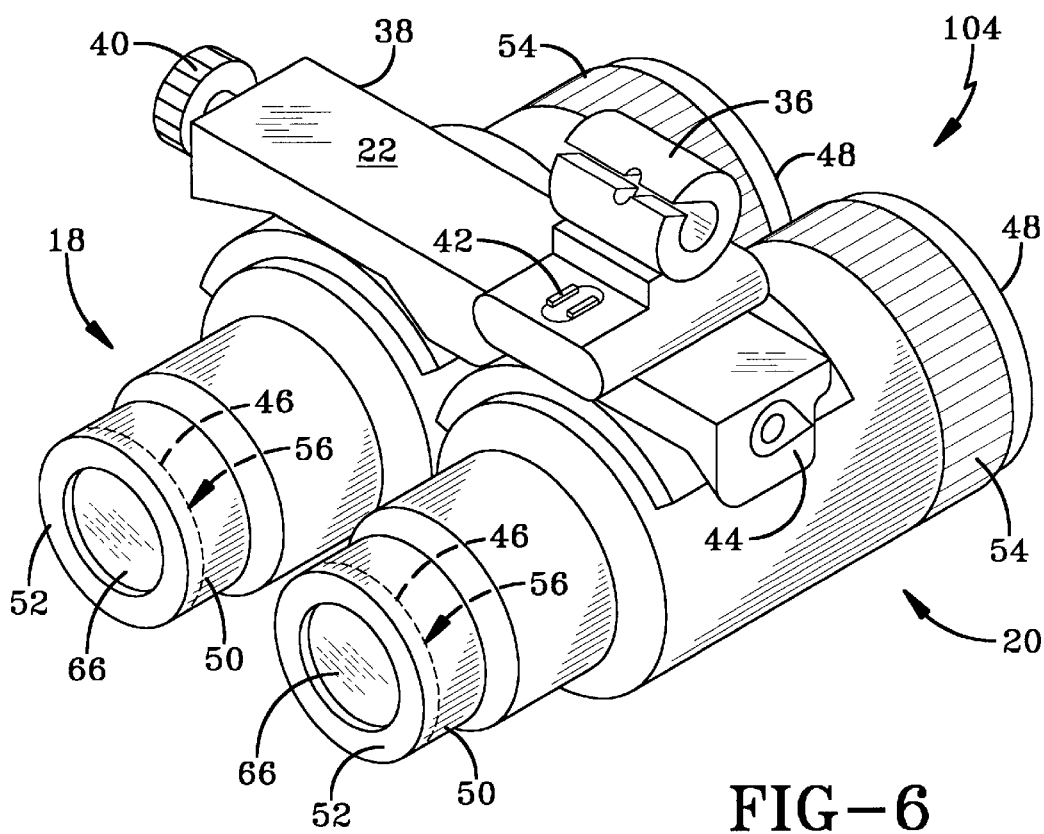
FIG. 6 illustrates night vision goggles that incorporate the adapter of the present invention.

As seen in FIG. 6, the binoculars 104 have the optical laser interference filter 66 positioned in the enclosure 50 of each monocular assembly 18 and 20 in front of its respective objective lens 46, generally indicated in phantom, with the adapter 56 mating the optical laser interference filter 66 with the objective lens 46 so that any sudden burst of visible light created by a laser source or some other similar light source is attenuated by the optical laser interference filter 66 so as to prevent any damage or disturbance to the optical components of the night vision goggles having the improved binoculars 104.

It should now be appreciated that the present invention provide an adapter 56 that easily mates an optical laser interference filter 66 with the objective lens 46 so as to provide compatibility between NVGs equipped with the laser interference filter 66/laser interference filter mounting bezel 88 and the NVG Gideon HUD.

It should also be appreciated that the present invention provides an adapter that allows an optical laser interference filter to be quickly attached to an optical instrument without the need to perform any modifications to or calibration of the optical instrument.

Furthermore, it should be appreciated that the present invention provides an adapter that holds its elements in a stationary, predetermined optical relationship with respect to each other and the optical axis of the instrument, yet be easily disassembled for cleaning purposes.

Many modifications or variations of the present invention are possible in view of the above disclosure. It is, therefore, to be understood, that within the scope of the appended claims, the invention may be practiced otherwise as specifically described.

What we claim is:

1. An adapter for an optical instrument having an objective lens, a laser interference filter having a first set of threads of a first predetermined pitch and defined by the outer diameter of said laser interference filter, and a laser interference filter mounting bezel having a second set of threads of a second predetermined pitch and defined by the inner diameter of said laser interference filter mounting bezel, said adapter comprising a nipple having third and fourth sets of threads with pitches thereof respectively corresponding to said first and second pitches and with said pitches of said third and fourth sets of threads being respectively defined by said outer diameter of said laser interference filter and said inner diameter of said laser interference filter mounting bezel.

2. The adapter according to claim 1, wherein laser interference filter has a predetermined attenuation band defined by a visible-light range between 7500 and 3900 angstroms corresponding to that of a laser.

3. The adapter according to claim 1, wherein said nipple has an overall length of 0.480 inches, said third set of threads occupy a length of 0.195 inches, and said fourth set of threads occupy a length of 0.280 inches.

4. The adapter according to claim 1, wherein said nipple is comprised of an anodized aluminum alloy.

5. An optical instrument having an objective lens, a laser interference filter having a first set of threads of a first predetermined pitch and defined by the outer diameter of said laser interference filter, and a laser interference filter mounting bezel having a second set of threads of a second predetermined pitch and defined by the inner diameter of said laser interference filter mounting bezel, said objective lens being confined in an enclosure having an entrance portion, said optical instrument further including an adapter comprising a nipple having third and fourth sets of threads with pitches thereof respectively corresponding to said first and second pitches and with said pitches of said third and fourth sets of threads being respectively defined by said outer diameter of said laser interference filter and said inner diameter of said laser interference filter mounting bezel, said nipple being housed in said enclosure so that said third set of threads is facing said entrance portion of said enclosure.

6. The instrument according to claim 5, wherein said laser interference filter has a predetermined attenuation band defined by a visible-light range between 7500 and 3900 angstroms corresponding to that of a laser.

7. The instrument according to claim 5, wherein said nipple has an overall length of 0.480 inches, said third set of threads occupy a length of 0.195 inches, and said fourth set of threads occupy a length of 0.280 inches.

8. The optical instrument according to claim 5, wherein said nipple is comprised of an anodized aluminum alloy.

9. An optical instrument having two monocular assemblies arranged side-by-side to form a pair of binoculars sensitive to the infrared spectrum so as to provide night vision for the user of said binocular, each of said monocular assemblies having an objective lens confined in an enclosure having an entrance portion, a laser interference filter having a first set of threads of a first predetermined pitch and defined by the outer diameter of said laser interference filter, and a laser interference filter mounting bezel having a second set of threads of a second predetermined pitch and defined by the inner diameter of said laser interference filter mounting bezel, said optical instrument further including an adapter comprising a nipple having third and fourth sets of threads with pitches thereof respectively corresponding to said first and second pitches and with said pitches of said third and fourth sets of threads being respectively defined by said outer diameter of said laser interference filter and said inner diameter of said laser interference filter mounting bezel, said nipple being housed in said enclosure so that said third set of threads is facing said entrance portion of said enclosure.

10. The optical instrument according to claim 9, wherein said laser interference filter has a predetermined attenuation band defined by a visible-light range between 7500 and 3900 angstroms corresponding to that of a laser.

11. The optical instrument according to claim 9, wherein said nipple has an overall length of 0.480 inches, said third set of threads occupy a length of 0.195 inches, and said fourth set of threads occupy a length of 0.280 inches.

12. The optical instrument according to claim 9, wherein said nipple is comprised of an anodized aluminum alloy.

* * * * *